(12) United States Patent
Wang et al.

(10) Patent No.: US 8,390,995 B2
(45) Date of Patent: Mar. 5, 2013

(54) ADJUSTING DEVICE OF ADJUSTING A VIEW ANGLE OF A PANEL MODULE AND COMPUTER SYSTEM HAVING THE SAME

(75) Inventors: Kuo-Hsing Wang, New Taipei (TW); Sung-Yu Hsieh, New Taipei (TW); Yu-Min Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 114 days.

(21) Appl. No.: 13/184,563

(22) Filed: Jul. 17, 2011

(65) Prior Publication Data
US 2012/0257351 A1 Oct. 11, 2012

(30) Foreign Application Priority Data
Apr. 7, 2011 (TW) .................... 100112097

(51) Int. Cl.
*H05K 5/00* (2006.01)
*H05K 7/00* (2006.01)

(52) U.S. Cl. ......... 361/679.21; 361/679.03; 361/679.26; 361/679.3; 361/679.55; 361/679.56

(58) Field of Classification Search ............. 361/679.03, 361/679.21, 679.26, 679.3, 679.55, 679.56
See application file for complete search history.

(56) References Cited

U.S. PATENT DOCUMENTS

| | | | | |
|---|---|---|---|---|
| 5,267,181 A * | 11/1993 | George | .......................... | 708/142 |
| 5,404,267 A * | 4/1995 | Silva et al. | ............... | 361/679.03 |
| 6,016,248 A * | 1/2000 | Anzai et al. | ............. | 361/679.59 |
| 6,301,101 B1 * | 10/2001 | Anzai et al. | ................. | 361/679.3 |
| 2005/0250455 A1 * | 11/2005 | Lee et al. | ..................... | 455/90.3 |

* cited by examiner

Primary Examiner — Anthony Haughton
(74) Attorney, Agent, or Firm — Winston Hsu; Scott Margo

(57) ABSTRACT

An adjusting device includes a rotating mechanism disposed between a base and a supporter for adjusting an angle between the supporter and the base, a slide mechanism disposed on the base, and a turntable mechanism slidably disposed on the slide mechanism for holding a panel module, so that the panel module can slide relative to the base along the slide mechanism and for coaxially rotating the panel module relative to the base. A contacting component of the turntable mechanism is for pushing a constraining component of the slide mechanism to pivot relative to an axle, so as to separate the constraining component from a protruding portion of the rotating mechanism for releasing constraint on the supporter relative to the base.

24 Claims, 16 Drawing Sheets

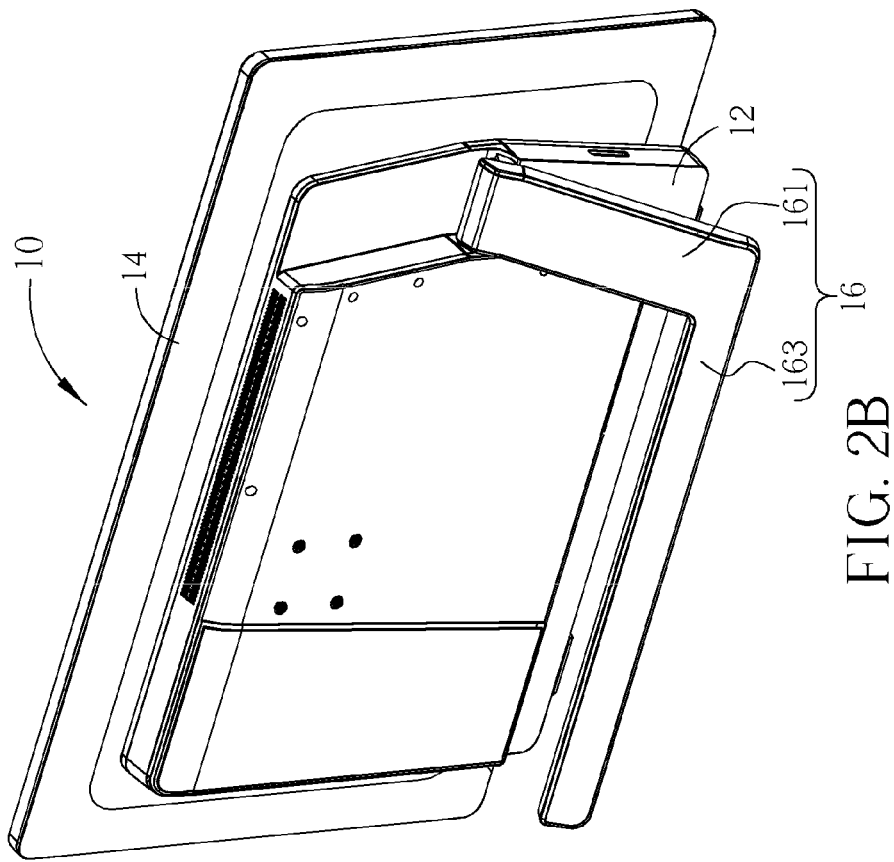
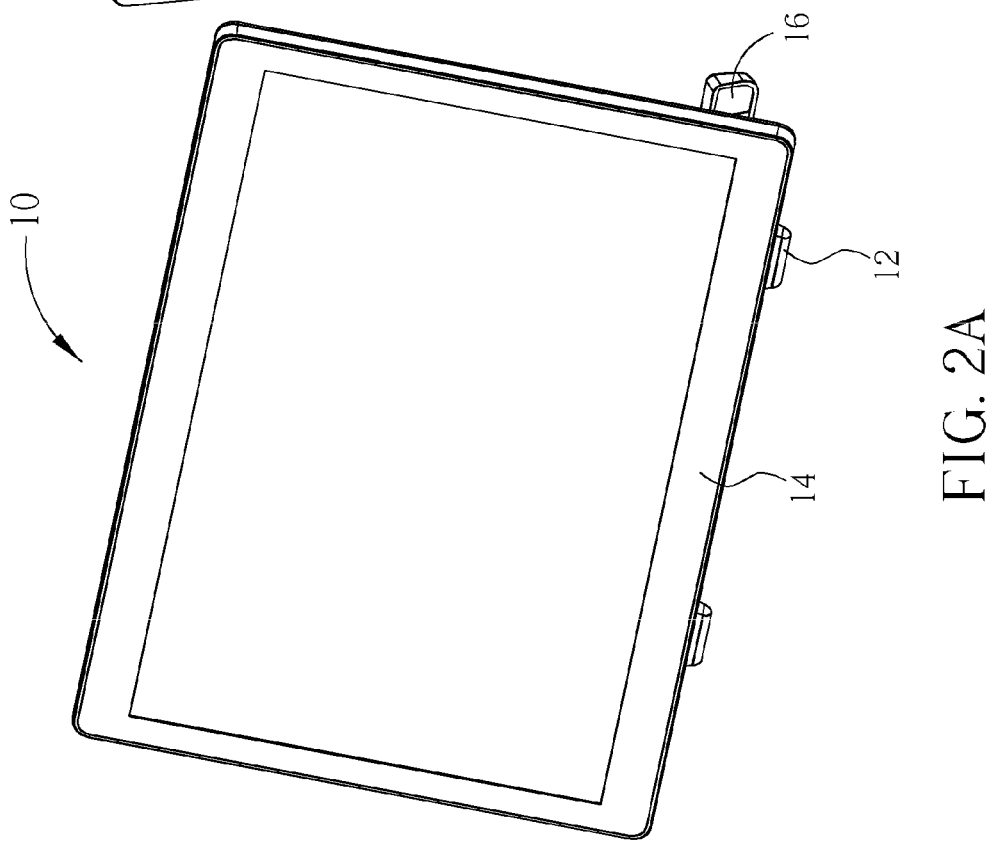
FIG. 2B
FIG. 2A

ADJUSTING DEVICE OF ADJUSTING A VIEW ANGLE OF A PANEL MODULE AND COMPUTER SYSTEM HAVING THE SAME

BACKGROUND OF THE INVENTION

1. Field of the Invention

The present invention relates to an adjusting device, and more particularly, to an adjusting device capable of adjusting a view angle of a panel module and a computer system having the same.

2. Description of the Prior Art

Conventional tablet computers include three main types, such as a dual-utilization type, a tablet type, and a tri-utilization type. The dual-utilization type tablet computer is similar to a common notebook computer. Electronic processing components, such as a processor, are disposed inside a lower casing with a keyboard module of the dual-utilization type tablet computer. A panel of the dual-utilization type tablet computer can be rotated to fold on the keyboard module, so that the dual-utilization type tablet computer can be utilized as the tablet computer. Therefore, the dual-utilization type tablet computer can be switched to different operating modes according to a user's demand. The tablet type computer and the tri-utilization type tablet computer dispose the panel and the electronic processing components, such as a processor, inside the same casing together, so that appearances of the tablet type computer and the tri-utilization type computer are similar to a portable handwriting electronic panel. For example, the tri-utilization type tablet computer can be installed on a detachable keyboard, the tablet type computer can be installed on a wireless keyboard, and the tablet type computer and the tri-utilization type computer can be respectively disposed on corresponding supporting devices for standing on a base as the conventional desktop computer. The view angle of the tablet type computer can be adjusted by the corresponding supporting device. However, a range of the view angle of the conventional supporting device is limited and can not be adjusted according to user demand. Thus, design of a supporting mechanism with easy operation and preferable adjusting function for the view angle is an important issue of the electronic industry.

SUMMARY OF THE INVENTION

The present invention provides an adjusting device capable of adjusting a view angle of a panel module and a computer system having the same for solving above drawbacks.

According to the claimed invention, an adjusting device includes a rotating mechanism disposed between a foundation and a supporter for adjusting an angle between the supporter and the foundation. The rotating mechanism includes a protruding portion, and the protruding portion is rotated relative to the foundation with the supporter synchronously. The adjusting device further includes a slide mechanism disposed on the foundation. The slide mechanism includes a pivot axle, and a constraining component pivoted to the pivot axle for blocking the protruding portion of the rotating mechanism, so as to constrain rotation of the supporter relative to the foundation. The adjusting device further includes a turntable mechanism slidably disposed on the slide mechanism for holding a panel module so that the panel module slides relative to the foundation along the slide mechanism, and for coaxially rotating the panel module relative to the foundation. The turntable mechanism includes a contacting component for pushing the constraining component to pivot relative to the pivot axle when the turntable mechanism slides relative to the slide mechanism, so as to separate the constraining component from the protruding portion for releasing constraint on the supporter relative to the foundation.

According to the claimed invention, the slide mechanism further comprises a torsional spring for pivoting the constraining component relative to the pivot axle when the contacting component is separated from the constraining component, so as to recover the constraining component to an initial position.

According to the claimed invention, the slide mechanism further includes a base, and a slot structure slidably disposed on the base. The slot structure includes a first channel, a first contacting part, a sunken part, a second contacting part and a second channel. The slide mechanism further includes a clip structure connected to the slot structure, and the clip structure slides relative to the base with the slot structure synchronously. The slide mechanism further includes a positioning rod pivoting to the base for sliding from the first channel to the first contacting part when the slot structure slides relative to the base along a first direction, and further for sliding from the first contacting part to the sunken part and from the second contacting part to the second channel when the slot structure slides relative to the base along a second direction opposite to the first direction. The slide mechanism further includes a resilient component connected to the slot structure and the base for sliding the slot structure relative to the base along the second direction, so as to move the positioning rod from the second contacting part to the second channel. The turntable mechanism further includes a connecting portion for pushing the slot structure and the clip structure to slide relative to the base, and the connecting portion is clipped by the clip structure when the positioning rod is engaged inside the sunken part, so as to constrain a slide of the turntable mechanism relative to the slide mechanism along the second direction.

According to the claimed invention, the resilient component is further for sliding the slot structure relative to the base along the second direction when the connecting portion is clipped by the clip structure, so as to slide the positioning rod from the first contacting part to the sunken part.

According to the claimed invention, the adjusting device further includes a resilient mechanism disposed on an end of the slide mechanism and connected to the turntable mechanism via a flexible component for sliding the turntable mechanism relative to the slide mechanism along the second direction.

According to the claimed invention, the positioning rod is engaged inside the sunken part of the slot structure when the connecting portion is clipped by the clip structure, so as to prevent the turntable mechanism from sliding relative to the slide mechanism along the second direction by the resilient mechanism.

According to the claimed invention, the slide mechanism further includes a bottom, and a track structure disposed on the bottom. The track structure includes a first redirecting slot, a constraining slot and a second redirecting slot. The turntable mechanism further includes a pin for inserting into the first redirecting slot, the constraining slot and the second redirecting slot of the track structure as the turntable mechanism slides relative to the slide mechanism along a first direction. The turntable mechanism further includes a spring disposed on an end of the pin for sliding the pin from the first redirecting slot to the constraining slot and for sliding the pin from the constraining slot to the second redirecting slot along a direction perpendicular to the first direction.

According to the claimed invention, the spring stores a resilient recovering force when the pin slides to the first redirecting slot.

According to the claimed invention, the adjusting device further includes a resilient mechanism disposed on an end of the slide mechanism and connected to the turntable mechanism via a flexible component for sliding the turntable mechanism relative to the slide mechanism along the second direction.

According to the claimed invention, the pin is further for wedging inside the constraining slot, so as to constrain the turntable mechanism from sliding relative to the slide mechanism along the second direction by the resilient mechanism.

According to the claimed invention, a computer system includes a foundation, a panel module disposed on the foundation, a supporter pivoting to the foundation, and an adjusting device disposed between the panel module, the foundation and the supporter. The supporter is for pivoting relative to the foundation so as to adjust a view angle of the panel module. The adjusting device includes a rotating mechanism disposed between the foundation and the supporter for adjusting an angle between the supporter and the foundation. The rotating mechanism includes a protruding portion, and the protruding portion being rotated relative to the foundation with the supporter synchronously. The adjusting device further includes a slide mechanism disposed on the foundation. The slide mechanism includes a pivot axle, and a constraining component pivoted to the pivot axle for blocking the protruding portion of the rotating mechanism so as to constrain rotation of the supporter relative to the foundation. The adjusting device further includes a turntable mechanism slidably disposed on the slide mechanism for holding the panel module so that the panel module slides relative to the foundation along the slide mechanism, and for coaxially rotating the panel module relative to the foundation. The turntable mechanism includes a contacting component for pushing the constraining component to pivot relative to the pivot axle when the turntable mechanism slides relative to the slide mechanism, so as to separate the constraining component from the protruding portion for releasing constraint on the supporter relative to the foundation.

The adjusting device of the present invention can slide the panel module relative to the foundation linearly so as to adjust a height of the panel module relative to the desk. When the panel module linearly slides relative to the foundation, the adjusting device can utilize the contacting component of the turntable mechanism to lock or unlock limitation of the supporter relative to the foundation, so that an elevation of the panel module can be adjusted according to the user's demand. When the turntable mechanism slides to the end of the slide mechanism, the slide mechanism can utilize the slot structure, the clip structure and the positioning rod to constrain the slide of the turntable mechanism relative to the slide mechanism. In addition, the adjusting device of the present invention can further utilize the turntable mechanism to rotate the panel module relative to the foundation, so that the computer system of the present invention can be the tablet computer having two operating modes, such as a vertical mode and a horizontal mode. Therefore, the present invention provides the adjusting device capable of adjusting the view angle of the panel module with easy operation.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1A and FIG. 1B to FIG. 5A and FIG. 5B are diagrams of a computer system in different operating modes and different views according to an embodiment of the present invention.

DETAILED DESCRIPTION

Figure 1A:
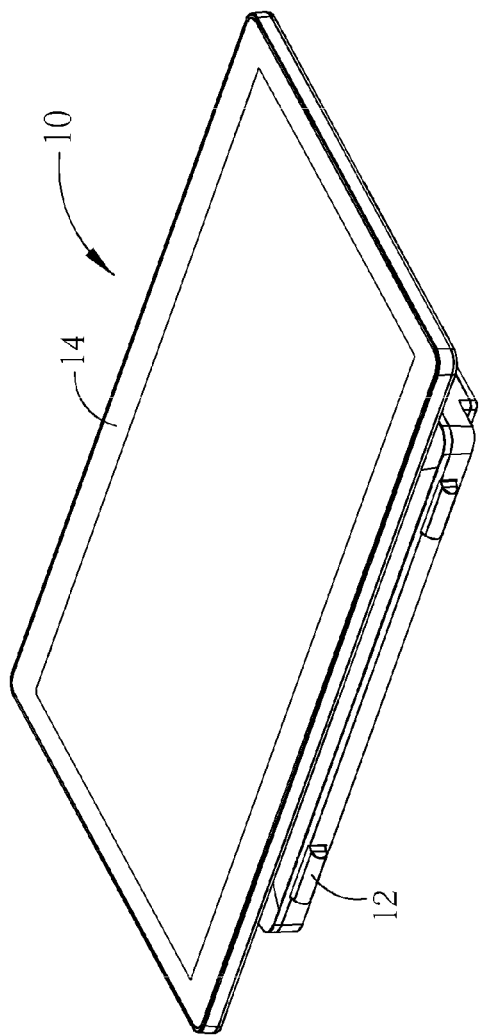

Please refer to FIG. 1A and FIG. 1B to FIG. 5A and FIG. 5B. FIG. 1A and FIG. 1B to FIG. 5A and FIG. 5B are diagrams of a computer system 10 in different operating modes and different views according to an embodiment of the present invention. The computer system 10 includes a foundation 10, a panel module 14 disposed on the foundation 12, a supporter 16 pivoting to the foundation 12, and an adjusting device 18 disposed between the panel module 14, the foundation 12 and the supporter 16. The adjusting device 18 is disposed inside casings of the panel module 14, the foundation 12 and the supporter 16, and is not shown in figures. As shown in FIG. 2B, the supporter 16 can include a connecting arm 161 and a supporting arm 163. The connecting arm 161 pivots to the foundation 12, and the supporting arm 163 is for supporting the panel module 14 on a plane. The supporter 16 can pivot relative to the foundation 12 for adjusting an angle of the panel module 14, and the adjusting device 18 adjusts a view angle of the panel module 14 relative to the foundation 12 by controlling an angle between the connecting arm 161 of the supporter 16 and the foundation 12. Therefore, the computer system 10 can be a tablet computer, and the view angle of the panel module 14 can be adjusted according to a user's demand.

Figure 6:
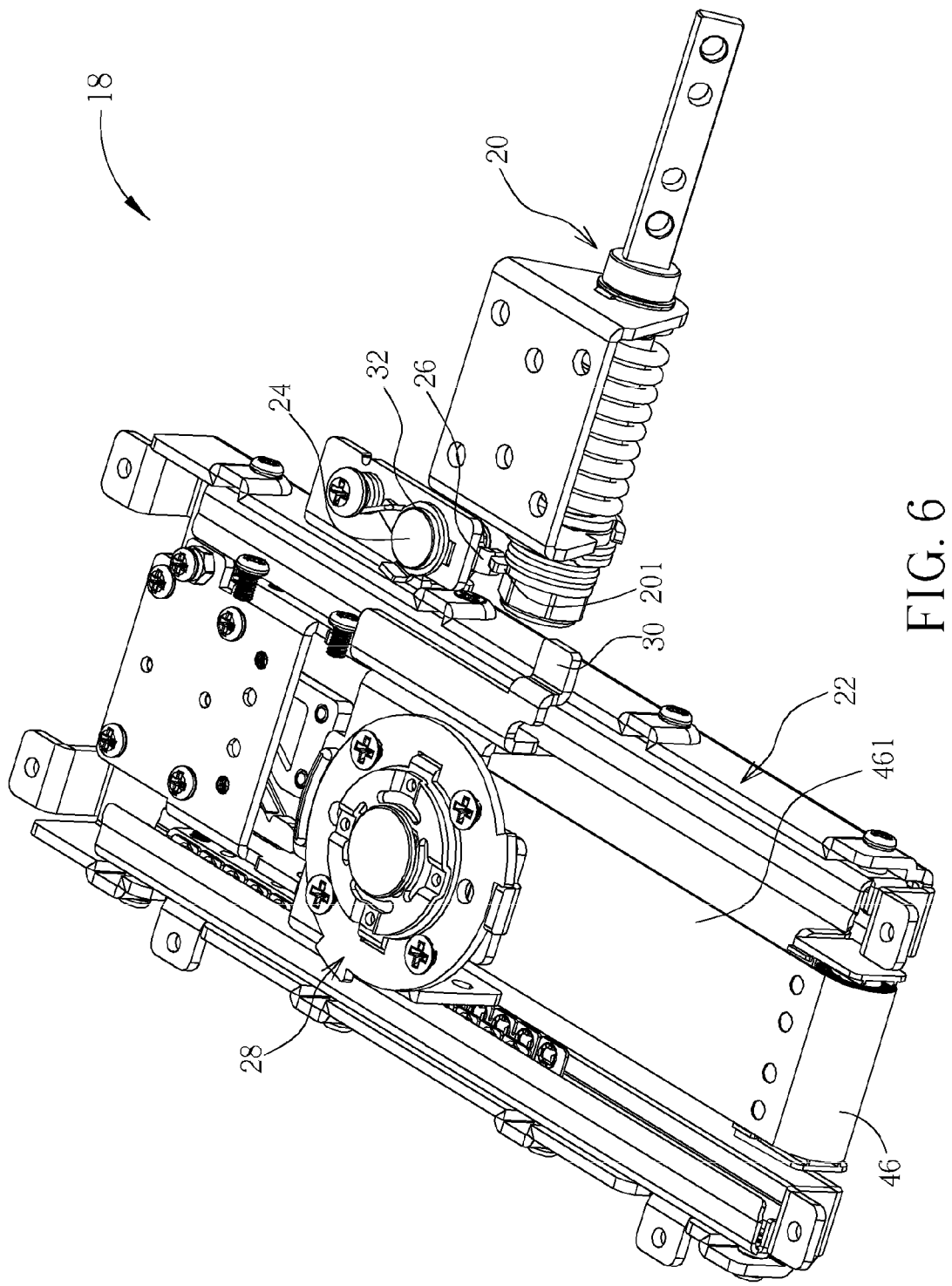
FIG. 6 and FIG. 7 are diagrams of internal structures of an adjusting device in different operating modes according to the embodiment of the present invention.
Figure 7:
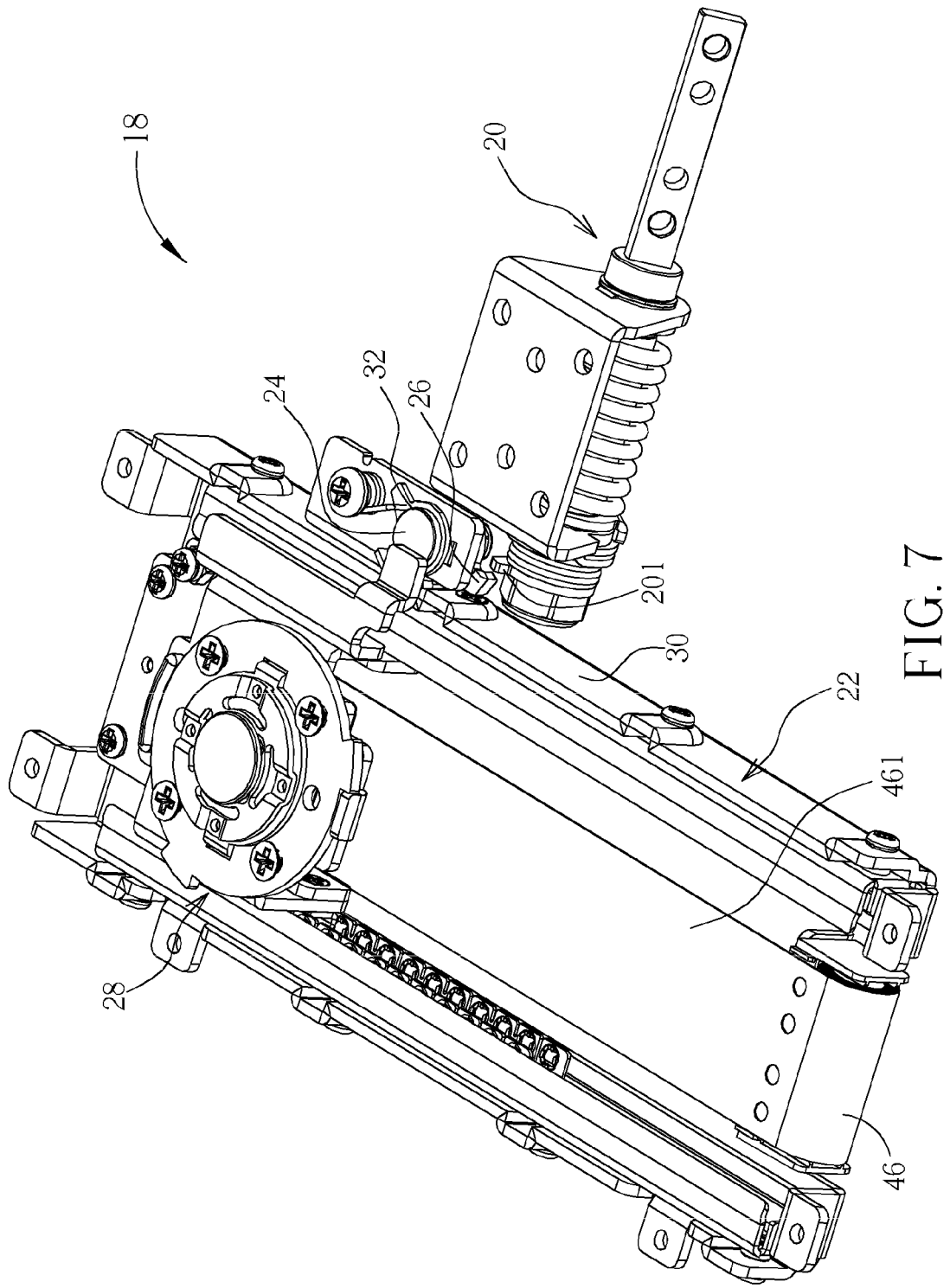
Figure 8:
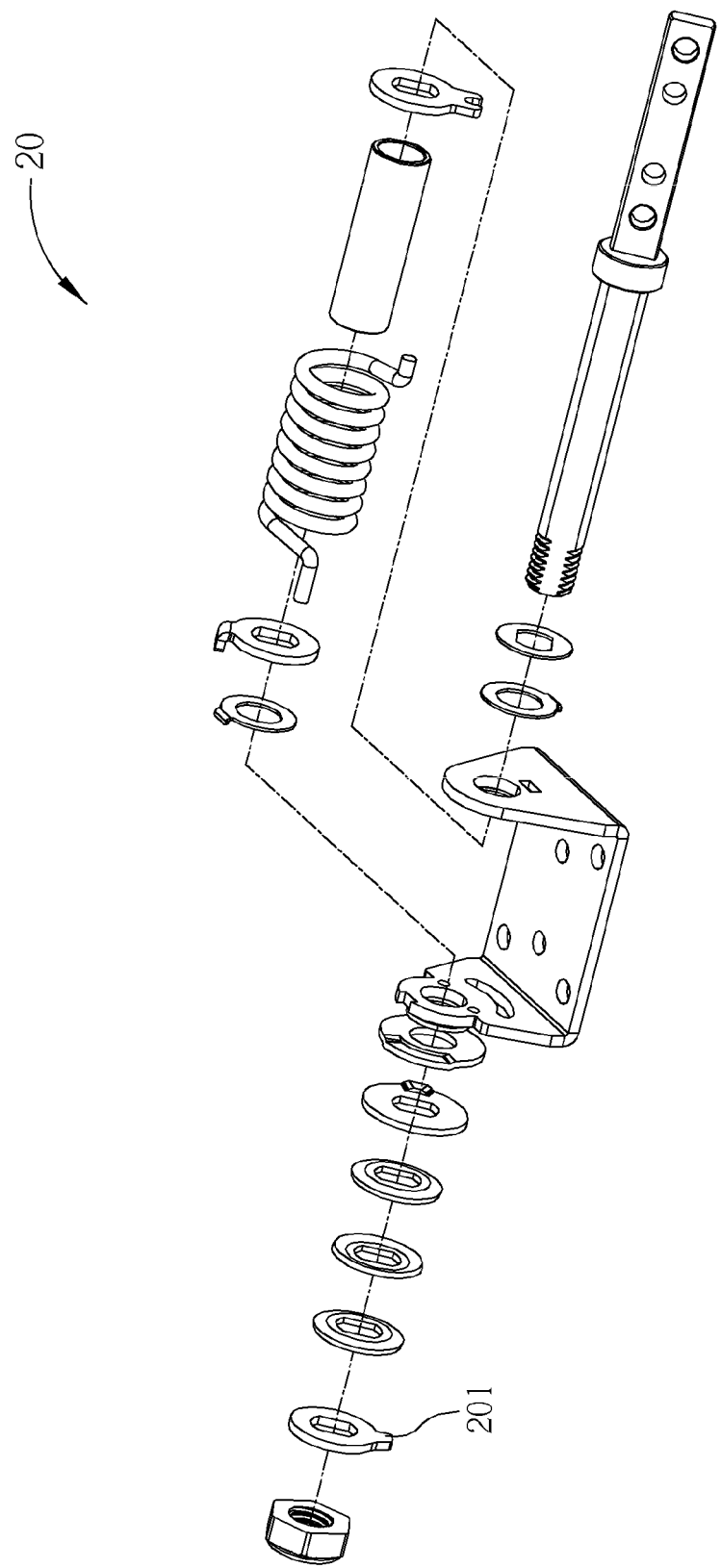
FIG. 8 is an exploded diagram of a rotating mechanism according to the embodiment of the present invention.

Please refer to FIG. 6 and FIG. 7. FIG. 6 and FIG. 7 are diagrams of internal structures of the adjusting device 18 in different operating modes according to the embodiment of the present invention. The adjusting device 18 includes a rotating mechanism 20 disposed between the foundation 12 and the supporter 16 for adjusting an angle between the supporter 16 and the foundation 12, so as to adjust the panel module 14 at a preferred view angle. Please refer to FIG. 8. FIG. 8 is an exploded diagram of the rotating mechanism 20 according to the embodiment of the present invention. As shown in FIG. 6 to FIG. 8, the rotating mechanism 20 includes a protruding portion 201, and the protruding portion 201 rotates relative to the foundation 12 with the supporter 16 synchronously. The adjusting device 18 further includes a slide mechanism 22 disposed on the foundation 12. The slide mechanism 22 includes a pivoting axle 24, and a constraining component 26 pivoted to the pivoting axle 24 for blocking the protruding portion 201 of the rotating mechanism 20. Thus, the constraining component 26 of the slide mechanism 22 can constrain rotation of the supporter 16 relative to the foundation 12 when the supporter 16 rotates relative to the foundation 12 via the rotating mechanism 20 at a predetermined angle, so that the panel module 14 can be fixed at the corresponding predetermined view angle.

The adjusting device 18 further includes a turntable mechanism 28 slidably disposed on the slide mechanism 22 for supporting the panel module 14, so that the panel module 14 can slide relative to the foundation 12 along the slide mechanism 22. The turntable mechanism 28 can be further for coaxially rotating the panel module 14 relative to the foundation 12, so that a position and an angle of the panel module 14 of the computer system 10 relative to the foundation 12 can be adjusted via slide and rotation of the turntable mechanism 28 relative to the slide mechanism 22. The turntable mechanism 28 includes a contacting component 30 for pushing the constraining component 26 to pivot relative to the pivoting axle 24 when the turntable mechanism 28 slides relative to the slide mechanism 22, so as to release constrain of the supporter 16 relative to the foundation 12 by separating the constraining component 26 from the protruding portion 201. The slide mechanism 22 can further include a torsional spring 32 for pivoting the constraining component 26 relative to the pivoting axle 24 when the contacting component 30 is separated from the constraining component 26, so as to recover the constraining component 26 to an initial position.

Figure 9:
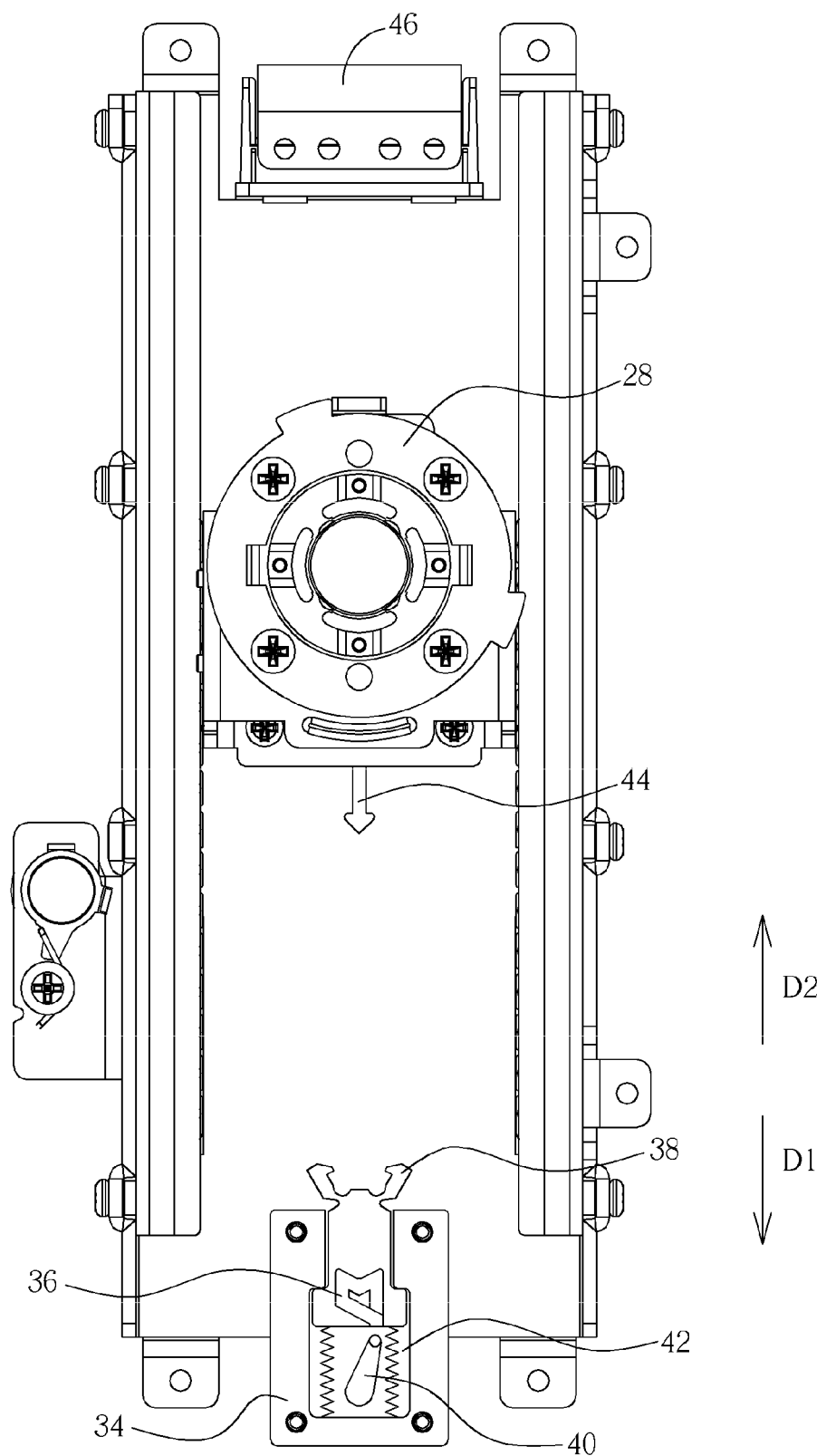
FIG. 9 is a diagram of the internal structure of the adjusting device at another view according to the embodiment of the present invention.
Figure 10:
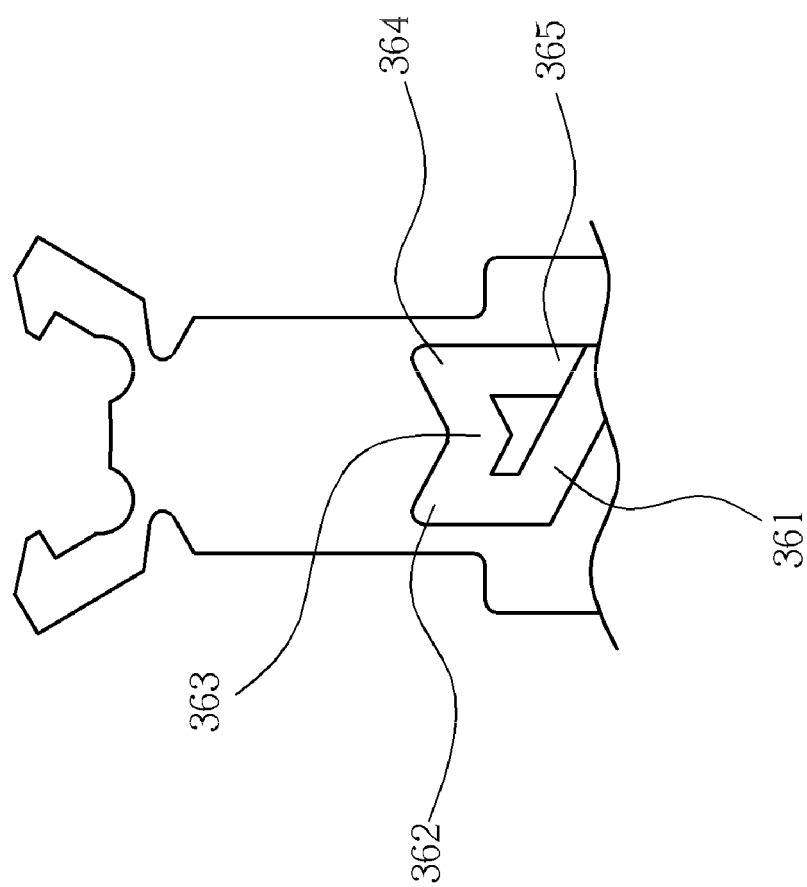
FIG. 10 is an enlarged diagram of a slot structure according to the embodiment of the present invention.

Please refer to FIG. 9. FIG. 9 is a diagram of the internal structure of the adjusting device 18 at another view according to the embodiment of the present invention. The slide mechanism 22 of the adjusting device 18 can further include a base 34, a slot structure 36 slidably disposed on the base 34, and a clip structure 38 connected to the slot structure 36. The clip structure 38 can slide relative to the base 34 with the slot structure 36 synchronously. Please refer to FIG. 10. FIG. 10 is an enlarged diagram of the slot structure 36 according to the embodiment of the present invention. The slot structure 36 can include a first channel 361, a first contacting part 362, a sunken part 363, a second contacting part 364 and a second channel 365. The slide mechanism 22 can further include a positioning rod 40 pivoting to the base 34. The positioning rod 40 can slide from the first channel 361 to the first contacting part 362 when the slot structure 36 slides relative to the base 34 along a first direction D1. The positioning rod 40 can slide from the first contacting part 362 to the sunken part 363 and from the second contacting part 364 to the second channel 365 when the slot structure 36 slides relative to the base 34 along a second direction D2 opposite to the first direction D1.

The slide mechanism 22 can further include a resilient component 42 connected to the slot structure 36 and the base 34 for sliding the slot structure 36 relative to the base 34 along the second direction D2, so as to slide the positioning rod 40 from the second contacting part 364 to the second channel 365. In addition, the turntable mechanism 28 can further include a connecting portion 44 for pushing the slot structure 36 and the clip structure 38 to slide relative to the base 34. The connecting portion 44 can be clipped by the clip structure 38 when the positioning rod 40 is engaged inside the sunken part 363, so as to constrain a slide of the turntable mechanism 28 relative to the slide mechanism 22 along the second direction D2. The resilient component 42 can be further for sliding the slot structure 36 relative to the base 34 along the second direction D2 when the connecting portion 44 is clipped by the clip structure 38, so that the positioning rod 40 can slide from the first contacting part 362 to the sunken part 363.

The adjusting device 18 can further include a resilient mechanism 46 disposed on an end of the slide mechanism 22 and connected to the turntable mechanism 28 via a flexible component 461 for sliding the turntable 28 relative to the slide mechanism 22 along the second direction D2. The positioning rod 40 can be for wedging inside the sunken part 363 of the slot structure 36 when the connecting portion 44 is clipped by the clip structure 38, so as to prevent the turntable mechanism 28 from sliding relative to the slide mechanism 22 along the second direction D2 by the resilient mechanism 46.

Figure 1B:
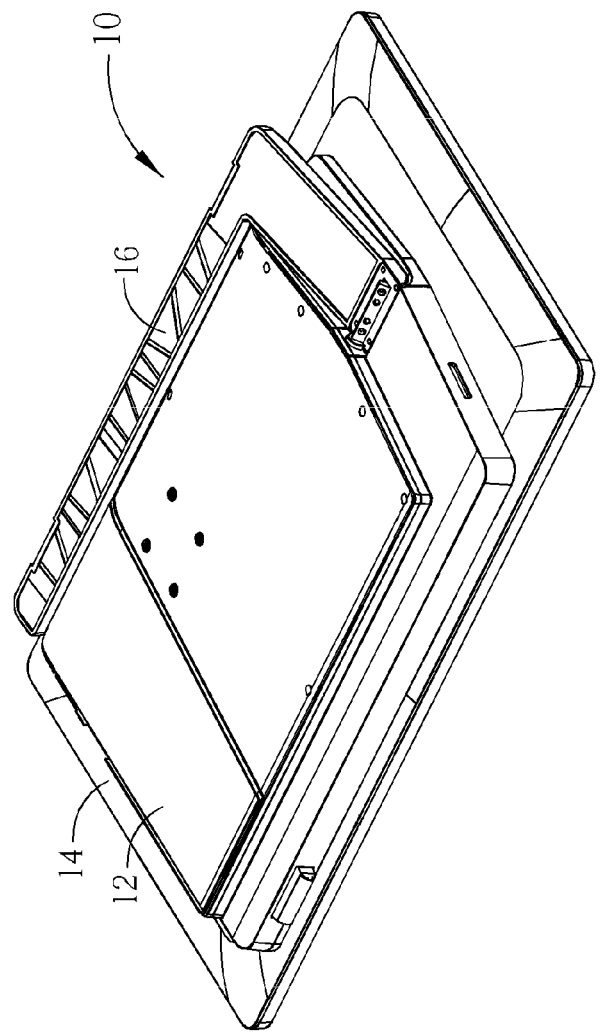
Figure 3B:
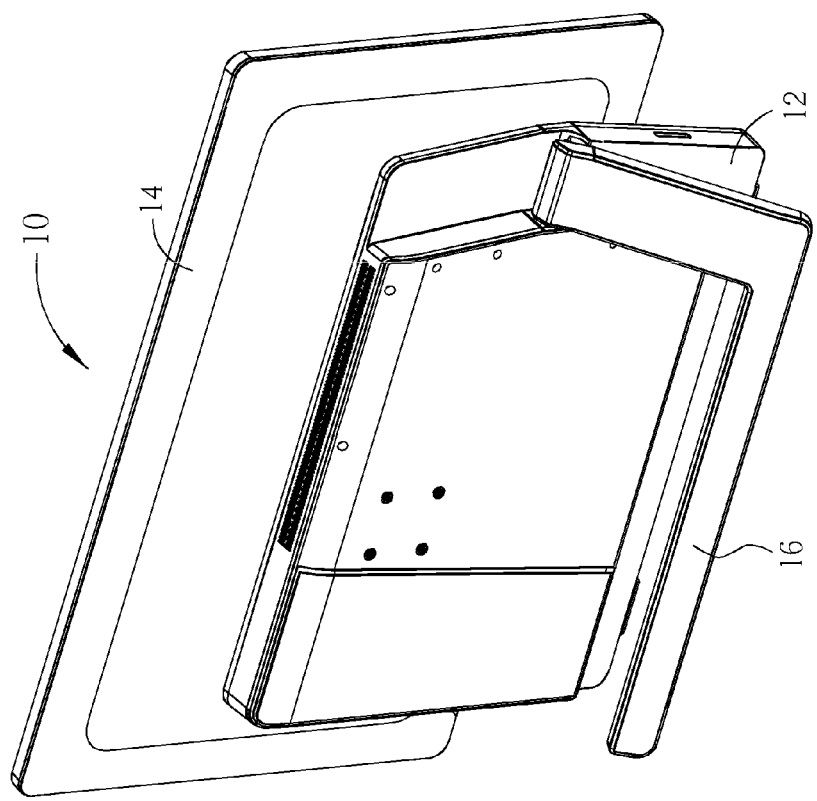
Figure 3A:
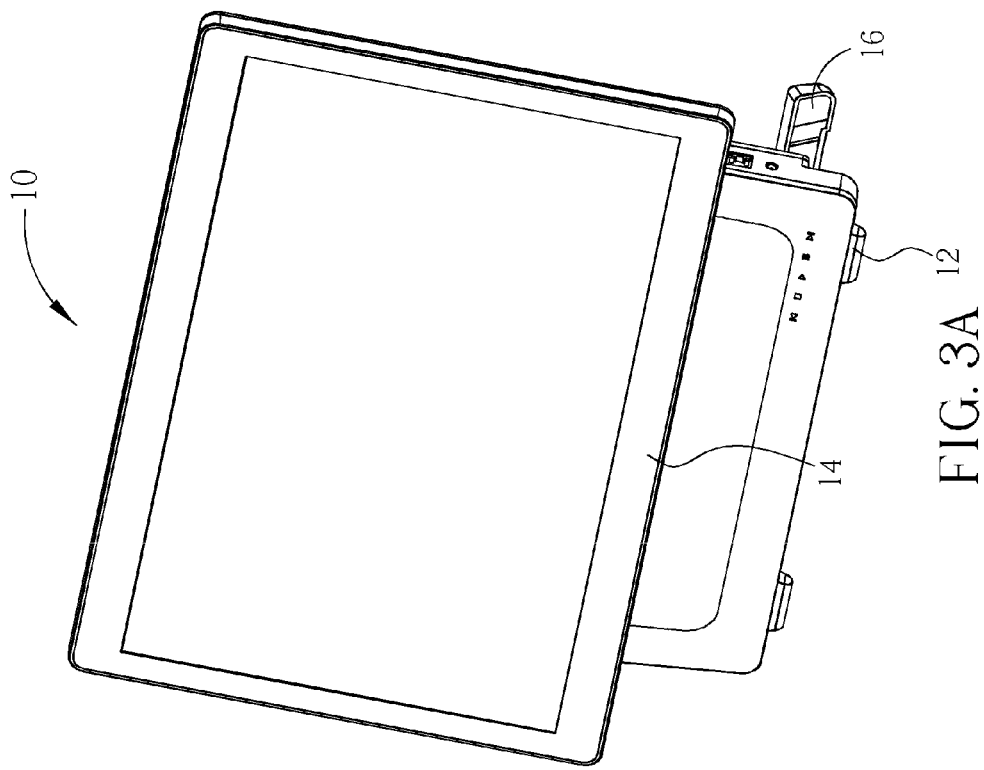

As shown in FIG. 1A and FIG. 1B, the supporter 16 of the computer system 16 contacts the foundation 12, and the computer system 10 can be a tablet computer on a desk. Meanwhile, the turntable mechanism 28 slides to the end of the slide mechanism 22. The contacting component 30 of the turntable mechanism 28 pushes the constraining component 26 of the slide mechanism 22 to pivot around the pivoting axle 24 so that the constraining component 26 is separated from the protruding portion 201, so the supporter 16 of the computer system 10 can rotate relative to the foundation 12 without constrain. For example, as shown in FIG. 2A and FIG. 2B, the supporter 16 can rotate relative to the foundation 12 at a predetermine angle, so as to hold the panel module 14 on the desk. In addition, a height of the panel module 14 relative to the foundation 12 can be adjusted by sliding the turntable mechanism 28 relative to the slide mechanism 22, as shown in FIG. 3A and FIG. 3B.

Figure 4B:
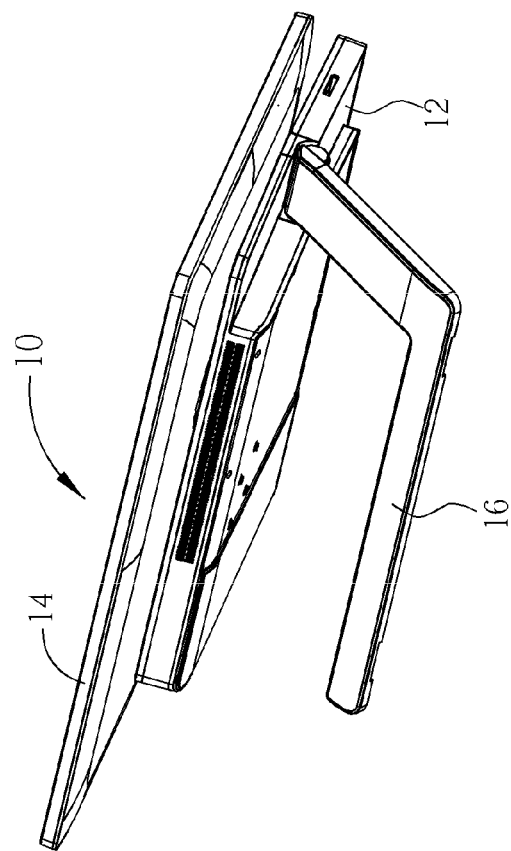
Figure 4A:
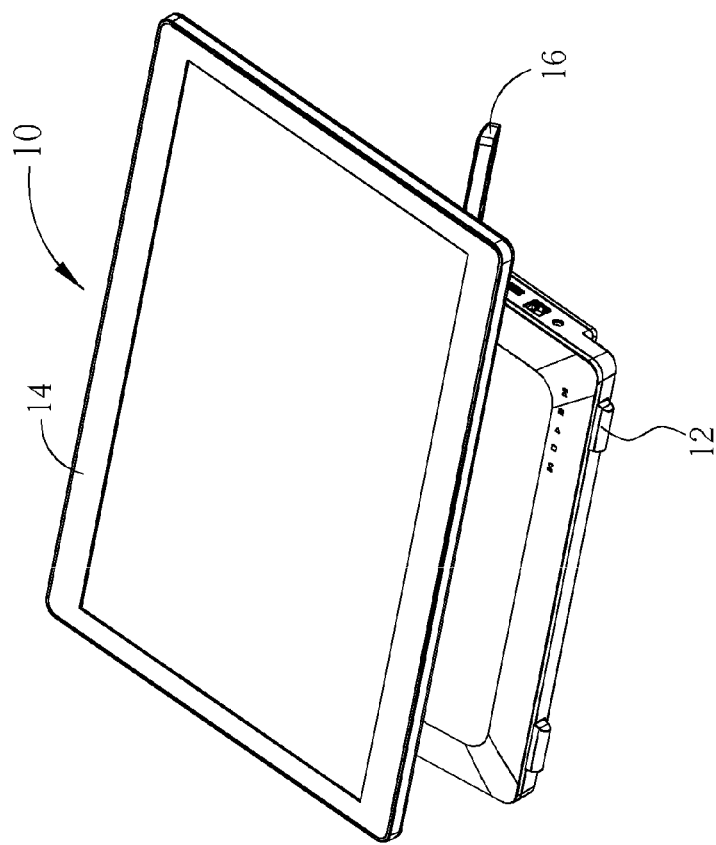
Figure 5B:
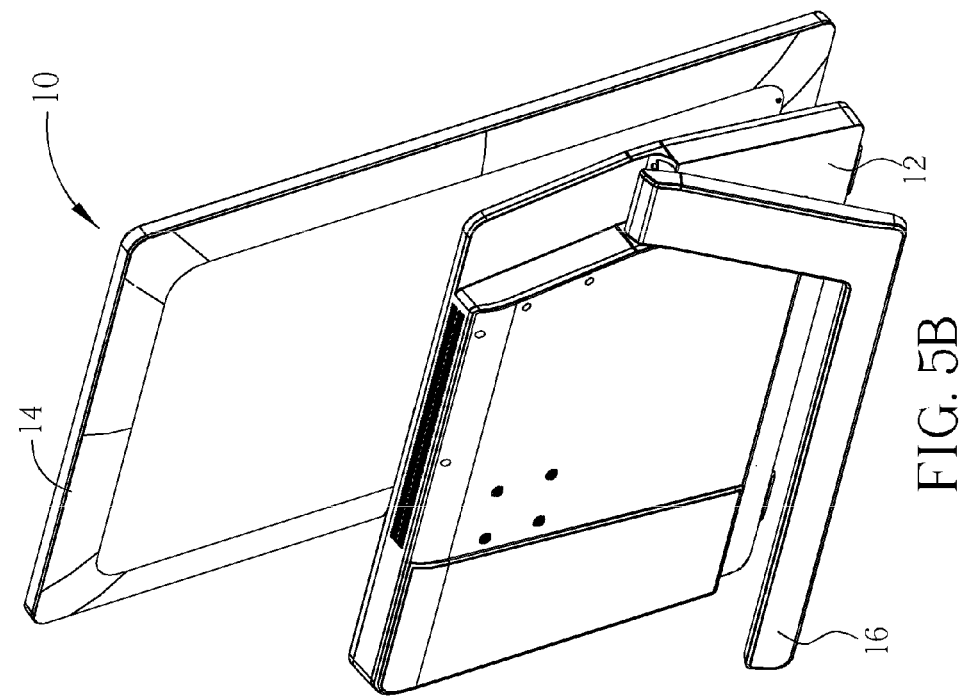
Figure 5A:
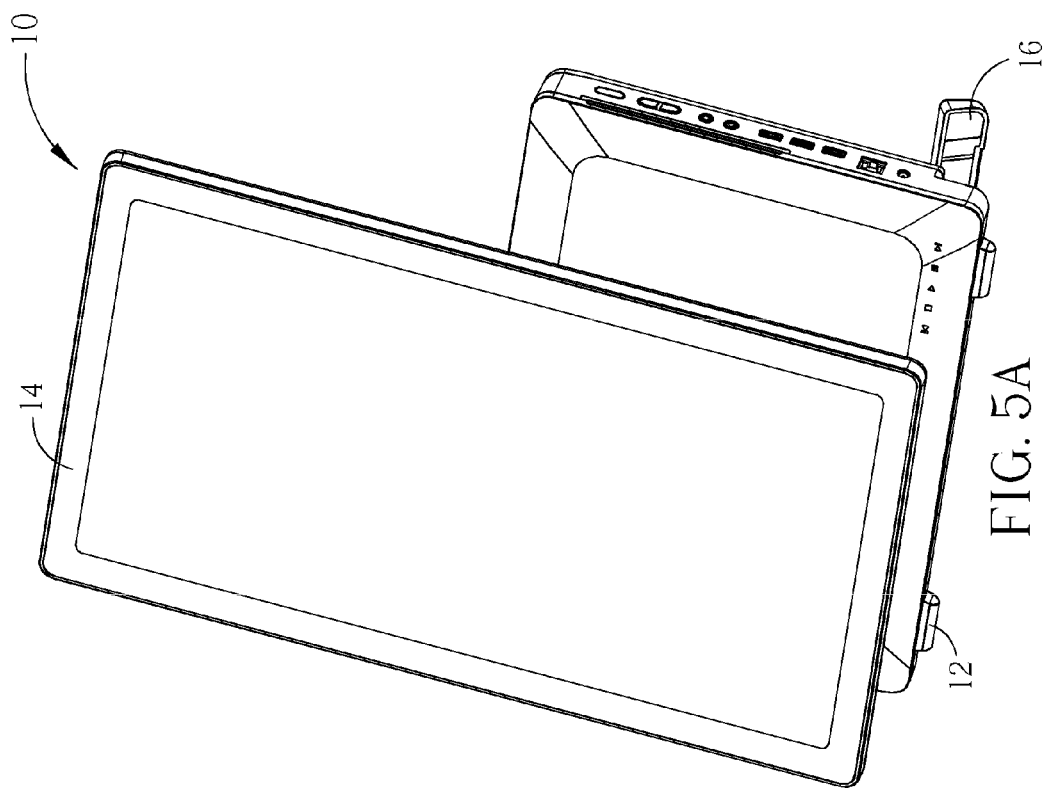

When the turntable mechanism 28 slides from the end of the slide mechanism 22 along the second direction D2, the contacting component 30 of the turntable mechanism 28 can slide upwardly from a position shown in FIG. 7 to a position shown in FIG. 6, meanwhile, the constraining component 26 of the slide mechanism 22 can pivot relative to the pivoting axle 24 by the torsional spring 32, so as to recover to the initial position for blocking the protruding portion 201 of the rotating mechanism 20. Thus, rotation of the supporter 16 relative to the foundation 12 is constrained. As shown in FIG. 4A and FIG. 4B, the supporter 16 can pivot relative to the foundation 12 at the other predetermined angle, such as 60 degrees, so that the computer system 10 can be set on the desk by a greater elevation for providing various view angles. Furthermore, the angle of the panel module 14 relative to the foundation 12 can be adjusted by the turntable mechanism 28, as shown in FIG. 5A and FIG. 5B. When the turntable mechanism 28 slides to the top of the slide mechanism 22 along the second direction D2 by the resilient mechanism 46, the panel module 14 can rotate relative to the foundation 12 via the turntable mechanism 28, so that the panel module 14 can be adjusted to a vertical stand mode or a horizontal stand mode according to the user's demand. For folding the computer system 10 from the operating mode shown in FIG. 5A and FIG. 5B to the operating mode shown in FIG. 1A and FIG. 1B, the computer system 10 can be adjusted to the tablet computer by means of the above-mentioned process inversely.

Figure 11B:
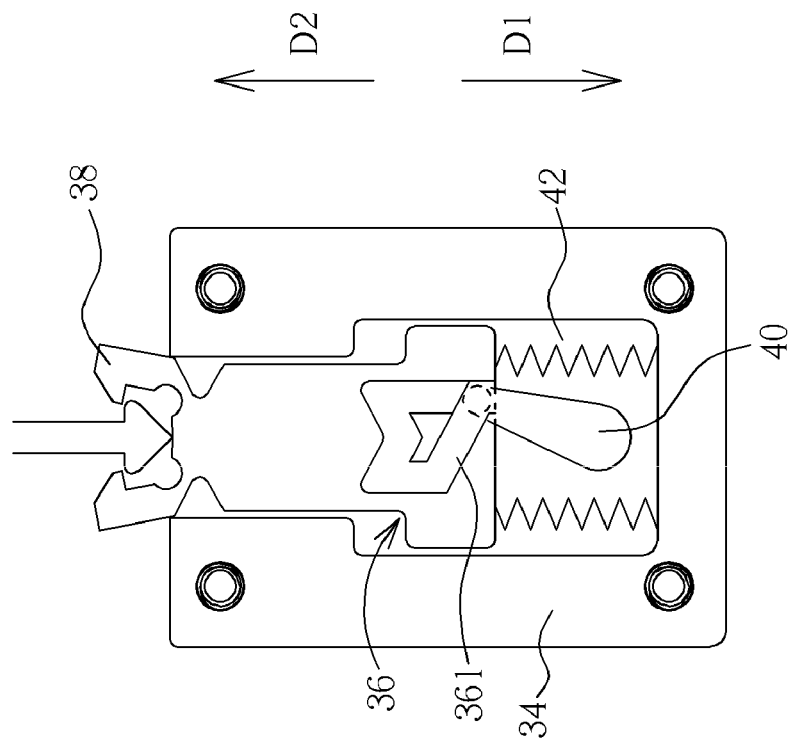
FIG. 11A to FIG. 11G are diagrams of a connecting portion of a turntable mechanism and the slot structure, a clip structure and a positioning rod of a slide mechanism according to the embodiment of the present invention.
Figure 11A:
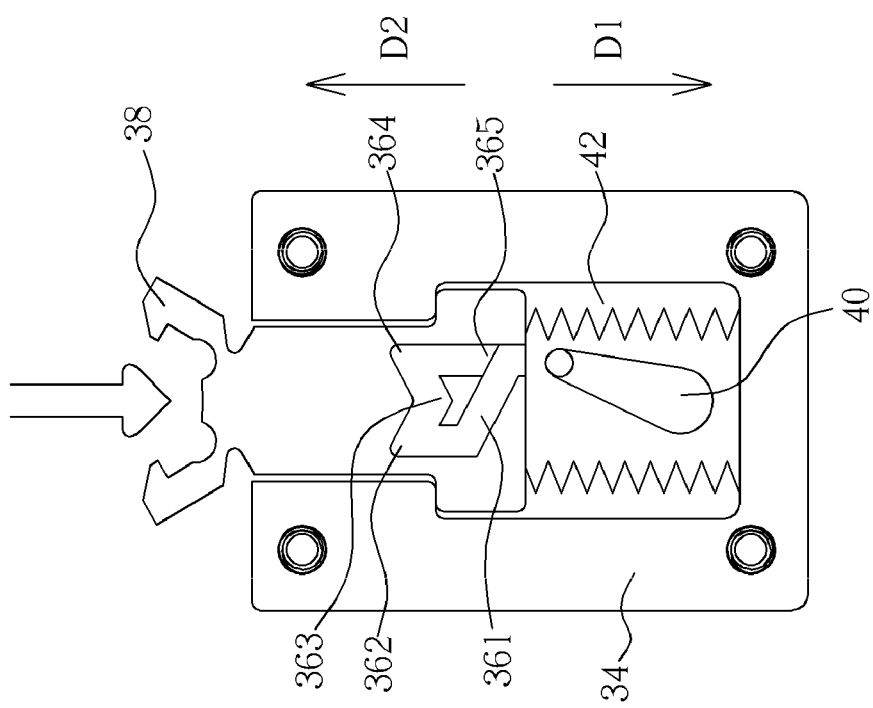

As the resilient mechanism 46 is for sliding the turntable mechanism 28 relative to the slide mechanism 22 along the second direction D2, the slot structure 36 of the slide mechanism 22 can prevent the turntable mechanism 28 from sliding along the second direction D2 by the resilient mechanism 46 when the turntable mechanism 28 slides to the end of the slide mechanism 22. Please refer to FIG. 11A to FIG. 11G, FIG. 11A to FIG. 11G are diagrams of the connecting portion 44 of the turntable mechanism 28 and the slot structure 36, the clip structure 38 and the positioning rod 40 of the slide mechanism 22 according to the embodiment of the present invention. As shown in FIG. 11A, the positioning rod 40 is not inserted into the slot structure 36 when the connecting portion 44 does not contact the clip structure 38. As shown in FIG. 11B, the slot structure 36 moves with the clip structure 38 when the connecting portion 44 pushes the clip structure 38 along the first direction D1 and is clipped by the clip structure 38, so the positioning rod 40 is inserted into the first channel 361 of the slot structure 36.

Figure 11C:
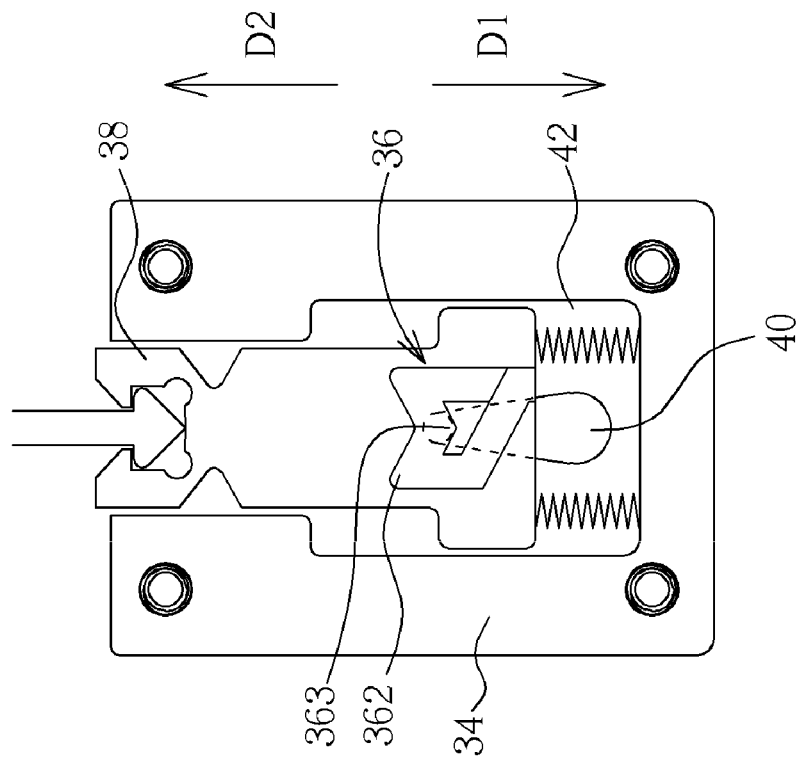
Figure 11D:
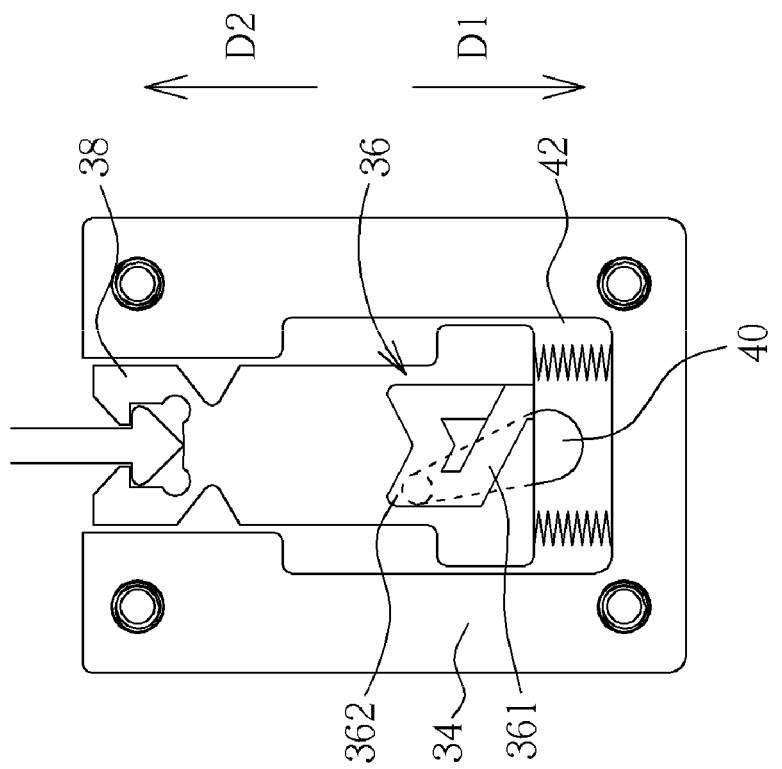

As shown in FIG. 11C, the positioning rod 40 slides from the first channel 361 to the first contacting part 362 as the connecting portion 44 keeps pushing the clip structure 38 along the first direction D1. As shown in FIG. 11A to FIG. 11C, the resilient component 42 is compressed. The resilient component 42 of the slide mechanism 22 can slide the slot structure 36 and the clip structure 38 relative to the base 34 along the second direction D2 when the turntable mechanism 28 stops sliding relative to the slide mechanism 22 along the first direction D1, as shown in FIG. 11D, so that the positioning rod 40 can slide from the first contacting part 362 to the sunken part 363 and is engaged inside the sunken part 363. Meanwhile, the clip structure 38 of the slide mechanism 22 can tightly clip the connecting portion 44 of the turntable mechanism 28 for preventing the turntable mechanism 28 from moving along the second direction D2 by the resilient mechanism 46.

Figure 11E:
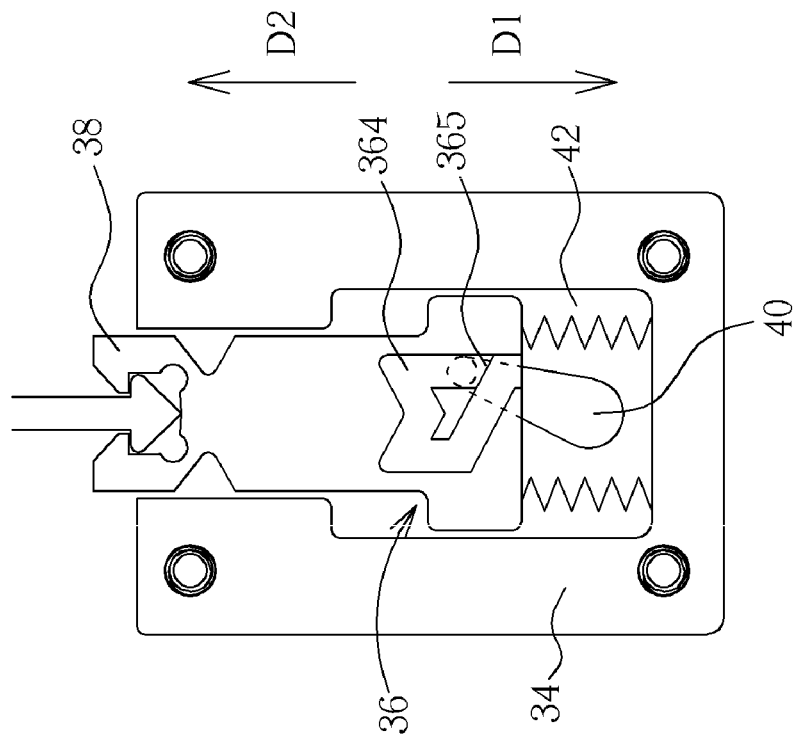
Figure 11F:
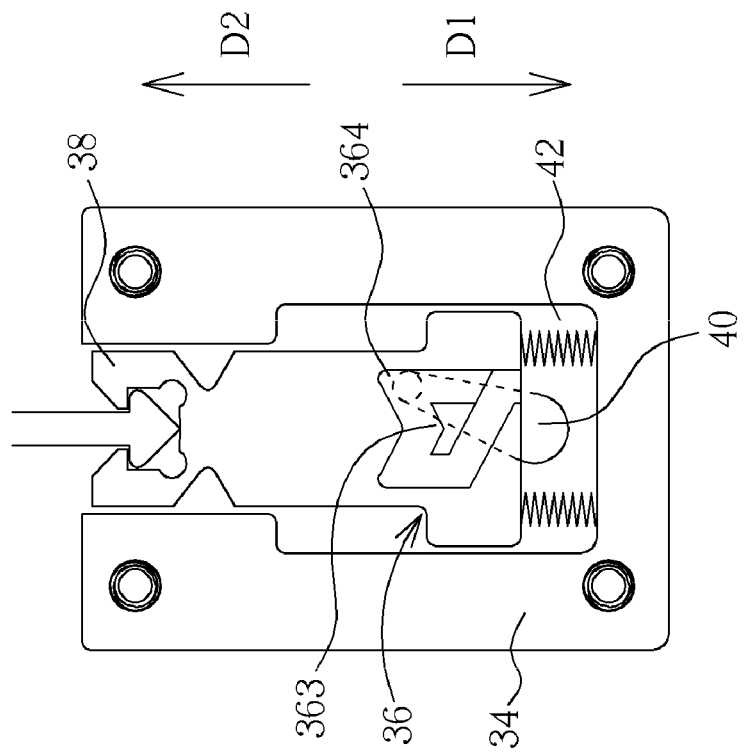
Figure 11G:
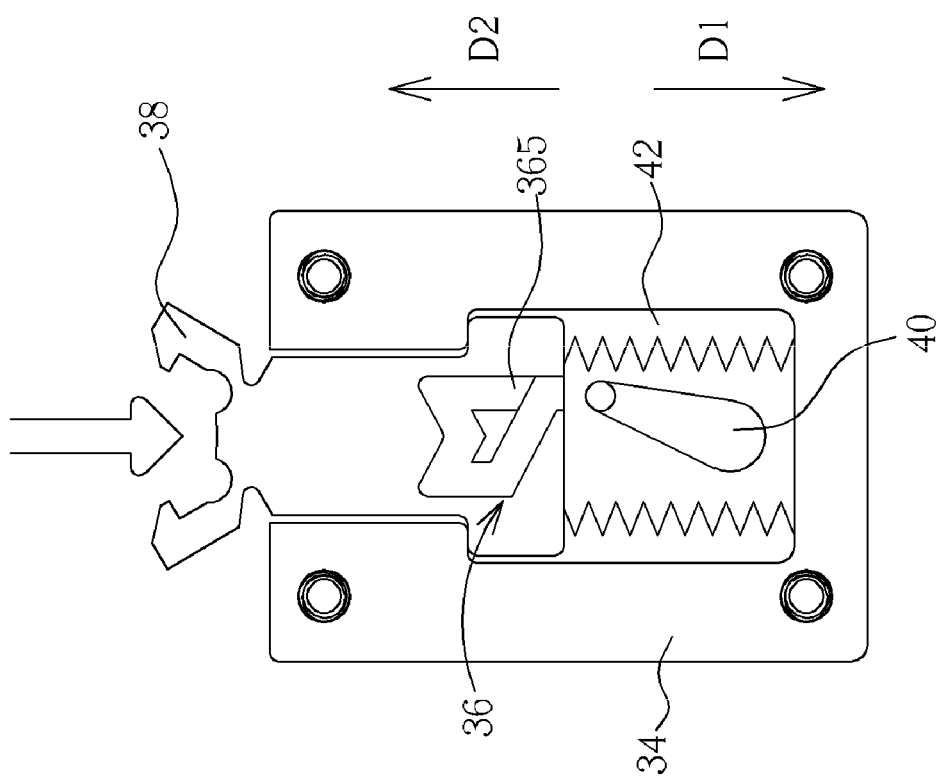

Final, the turntable mechanism 28 can be continuously moved along the first direction D1 for releasing constrain of the clip structure 38. The connecting portion 44 pushes the slot structure 36 and the clip structure 38 with the turntable mechanism 28, as shown in FIG. 11E to FIG. 11G. The positioning rod 40 can slide from the sunken part 363 to the second contacting part 364, so the positioning rod 40 is not engaged with the sunken part 363. As the slot structure 36 moves along the second direction D2 by the resilient component 42, the positioning rod 40 can slide from the second contacting part 364 to the second channel 365, and then separate from the slot structure 36, so that the turntable mechanism 28 can be separated from the slide mechanism 22 and slide relative to the slide mechanism 22 along the second direction D2. Therefore, the assembly of the connecting portion 44 of the turntable mechanism 28, the slot structure 36, the clip structure 38 and the positioning rod 40 of the slide mechanism 22 can act as a push-push latch mechanism for fixing the turntable mechanism 28.

Figure 12A:
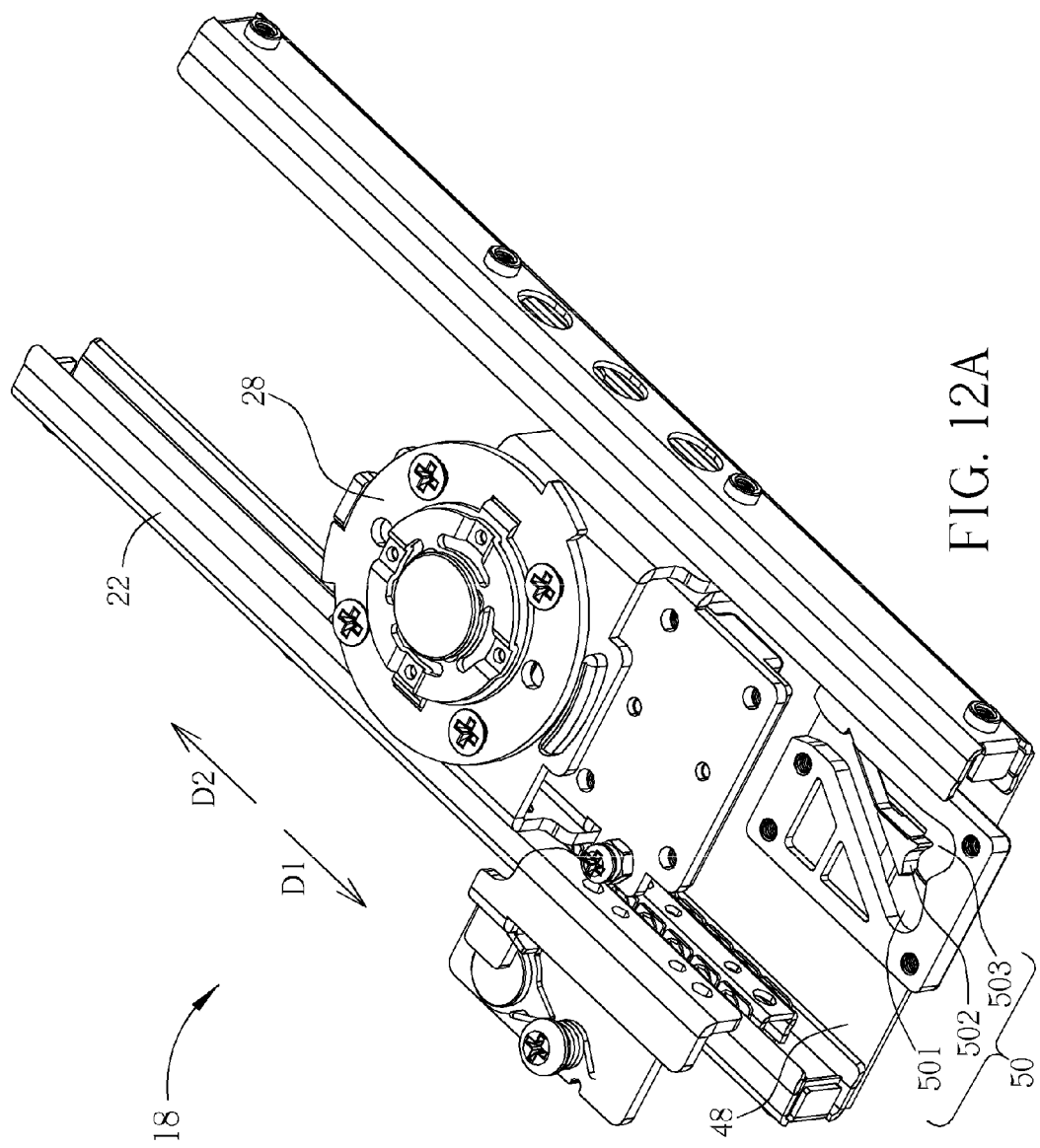
FIG. 12A and FIG. 12B are diagrams of the adjusting device in different views according to the other embodiment of the present invention.
Figure 12B:
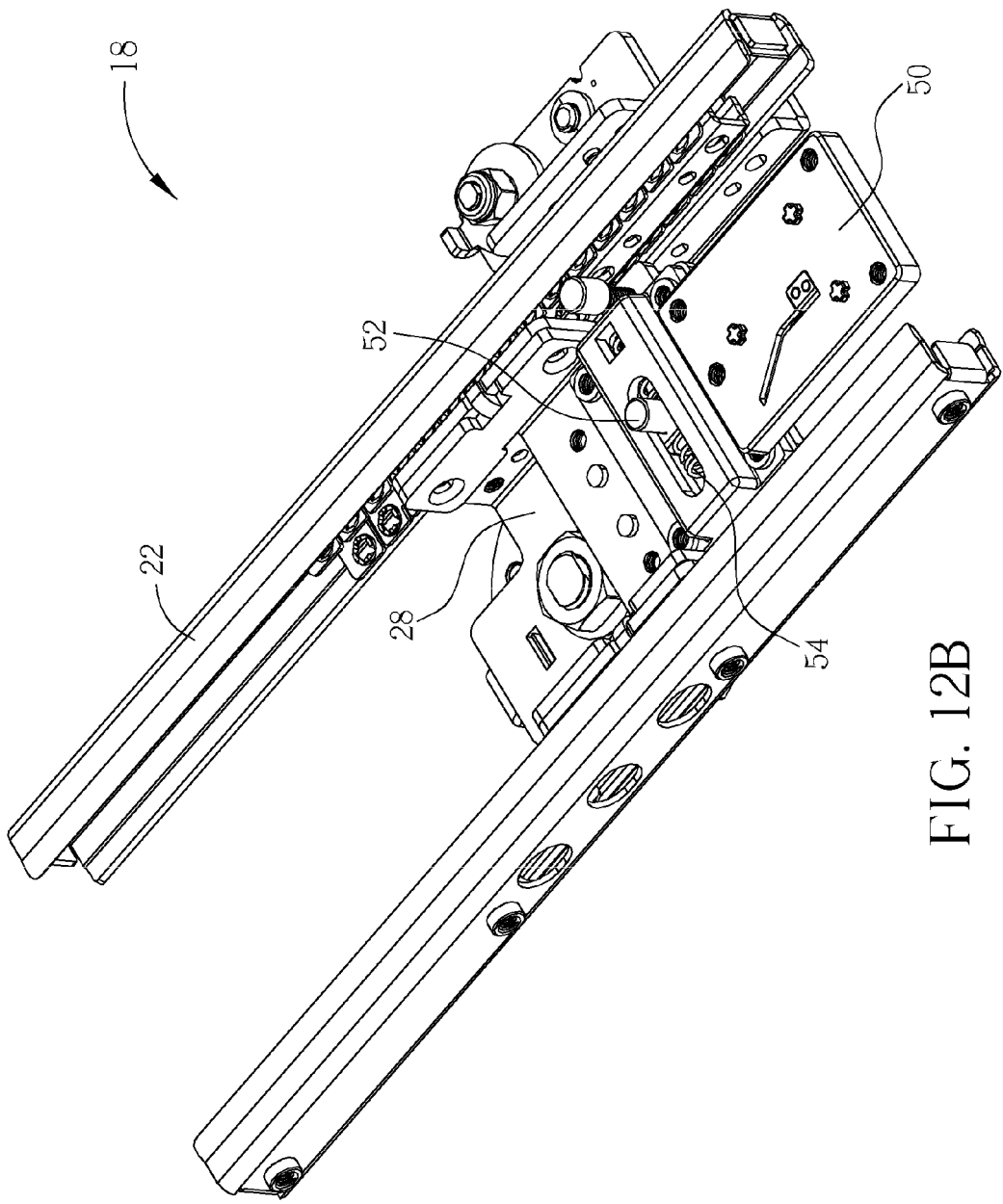

Please refer to FIG. 12A and FIG. 12B. FIG. 12A and FIG. 12B are diagrams of the adjusting device 18 in different views according to the other embodiment of the present invention. The slide mechanism 22 of the adjusting device 18 can further include a bottom 48 and a track structure 50. The track structure 50 is fixed on the bottom 48, and the track structure 50 can include a first redirecting slot 501, a constraining slot 502 and a second redirecting slot 503. In this embodiment, the turntable mechanism 28 can further include a pin 52 for inserting into the first redirecting slot 501, the constraining slot 502 and the second redirecting slot 503 of the track structure 50 when the turntable mechanism 28 slides relative to the slide mechanism 22 along the first direction D1. The turntable mechanism 28 can further include a spring 54 disposed on an end of the pin 52 for sliding the pin 52 from the first redirecting slot 501 to the constraining slot 502, and from the constraining slot 502 to the second redirecting slot 53 along a direction perpendicular to the first direction D1.

As shown in FIG. 6, FIG. 7, FIG. 12A and FIG. 12B, the pin 52 of the turntable mechanism 28 can insert into the track structure 50 of the slide mechanism 22 when the turntable mechanism 28 slides to the end of the slide mechanism 22 along the first direction D1. First, the pin 52 slides along the first redirecting slot 501, and the spring 54 stores a resilient recovering force as being compressed at this time. When the pin 52 slides at the end of the first redirecting slot 501, the pin 52 can move from the first redirecting slot 501 to the constraining slot 502 along the direction perpendicular to the first direction D1 by the resilient recovering force of the spring 54, so as to wedge the pin 52 inside the constraining slot 502 for preventing the turntable mechanism 28 from sliding relative to the slide mechanism 22 along the second direction D2. For releasing the constrain by the constraining slot 502, the turntable mechanism 28 can be pushed along the first direction D1, so that the pin 52 can move from the constraining slot 502 to the second redirecting slot 503 along the direction perpendicular to the first direction D1 by the resilient recovering force of the spring 54. Then the pin 52 can be separated from the constraining slot 502, and move away from the slot structure 50 with the turntable mechanism 28 by the resilient mechanism 46 for sliding relative to the slide mechanism 22 along the second direction D2. Therefore, the assembly of the pin 52 and the spring 54 of the turntable mechanism 28, and the track structure 50 of the slide mechanism 22 can act as a push-push latch mechanism for fixing the turntable mechanism 28.

Comparing to the prior art, the adjusting device of the present invention can slide the panel module relative to the foundation linearly so as to adjust a height of the panel module relative to the desk. When the panel module linearly slides relative to the foundation, the adjusting device can utilize the contacting component of the turntable mechanism to lock or unlock limitation of the supporter relative to the foundation, so that an elevation of the panel module can be adjusted according to the user's demand. When the turntable mechanism slides to the end of the slide mechanism, the slide mechanism can utilize the slot structure, the clip structure and the positioning rod to constrain the slide of the turntable mechanism relative to the slide mechanism. In addition, the adjusting device of the present invention can further utilize the turntable mechanism to rotate the panel module relative to the foundation, so that the computer system of the present invention can be the tablet computer having two operating modes, such as a vertical mode and a horizontal mode. Therefore, the present invention provides the adjusting device capable of adjusting the view angle of the panel module with easy operation.

Those skilled in the art will readily observe that numerous modifications and alterations of the device and method may be made while retaining the teachings of the invention.

What is claimed is:

1. An adjusting device comprising:
    a rotating mechanism disposed between a foundation and a supporter for adjusting an angle between the supporter and the foundation, the rotating mechanism comprising a protruding portion, and the protruding portion being rotated relative to the foundation with the supporter synchronously;
    a slide mechanism disposed on the foundation, the slide mechanism comprising:
        a pivot axle; and
        a constraining component pivoted to the pivot axle for blocking the protruding portion of the rotating mechanism so as to constrain rotation of the supporter relative to the foundation; and
    a turntable mechanism slidably disposed on the slide mechanism for holding a panel module so that the panel module slides relative to the foundation along the slide mechanism, and for coaxially rotating the panel module relative to the foundation, the turntable mechanism comprising:
        a contacting component for pushing the constraining component to pivot relative to the pivot axle when the turntable mechanism slides relative to the slide mechanism, so as to separate the constraining component from the protruding portion for releasing constraint on the supporter relative to the foundation.

2. The adjusting device of claim 1, wherein the slide mechanism further comprises a torsional spring for pivoting the constraining component relative to the pivot axle when the contacting component is separated from the constraining component, so as to recover the constraining component to an initial position.

3. The adjusting device of claim 1, wherein the slide mechanism further comprises:
a base;
a slot structure slidably disposed on the base, the slot structure comprising a first channel, a first contacting part, a sunken part, a second contacting part and a second channel;
a clip structure connected to the slot structure, the clip structure sliding relative to the base with the slot structure synchronously;
a positioning rod pivoting to the base for sliding from the first channel to the first contacting part when the slot structure slides relative to the base along a first direction, and further for sliding from the first contacting part to the sunken part and from the second contacting part to the second channel when the slot structure slides relative to the base along a second direction opposite to the first direction; and
a resilient component connected to the slot structure and the base for sliding the slot structure relative to the base along the second direction so as to move the positioning rod from the second contacting part to the second channel;
wherein the turntable mechanism further comprises:
a connecting portion for pushing the slot structure and the clip structure to slide relative to the base, and the connecting portion being clipped by the clip structure when the positioning rod is engaged inside the sunken part so as to constrain a slide of the turntable mechanism relative to the slide mechanism along the second direction.

4. The adjusting device of claim 3, wherein the resilient component is further for sliding the slot structure relative to the base along the second direction when the connecting portion is clipped by the clip structure, so as to slide the positioning rod from the first contacting part to the sunken part.

5. The adjusting device of claim 3, further comprising:
a resilient mechanism disposed on an end of the slide mechanism and connected to the turntable mechanism via a flexible component for sliding the turntable mechanism relative to the slide mechanism along the second direction.

6. The adjusting device of claim 5, wherein the positioning rod is engaged inside the sunken part of the slot structure when the connecting portion is clipped by the clip structure, so as to prevent the turntable mechanism from sliding relative to the slide mechanism along the second direction by the resilient mechanism.

7. The adjusting device of claim 1, wherein the slide mechanism further comprises:
a bottom; and
a track structure disposed on the bottom, the track structure comprising a first redirecting slot, a constraining slot and a second redirecting slot;
wherein the turntable mechanism further comprises:
a pin for inserting into the first redirecting slot, the constraining slot and the second redirecting slot of the track structure as the turntable mechanism slides relative to the slide mechanism along a first direction; and
a spring disposed on an end of the pin for sliding the pin from the first redirecting slot to the constraining slot and for sliding the pin from the constraining slot to the second redirecting slot along a direction perpendicular to the first direction.

8. The adjusting device of claim 7, wherein the spring stores a resilient recovering force when the pin slides to the first redirecting slot.

9. The adjusting device of claim 7, further comprising:
a resilient mechanism disposed on an end of the slide mechanism and connected to the turntable mechanism via a flexible component for sliding the turntable mechanism relative to the slide mechanism along the second direction.

10. The adjusting device of claim 9, wherein the pin is further for wedging inside the constraining slot, so as to constrain the turntable mechanism from sliding relative to the slide mechanism along the second direction by the resilient mechanism.

11. An adjusting device comprising:
a slide mechanism disposed on a foundation, the slide mechanism comprising:
a bottom; and
a track structure disposed on the bottom, the track structure comprising
a first redirecting slot, a constraining slot and a second redirecting slot; and
a turntable mechanism slidably disposed on the slide mechanism for holding a panel module so that the panel module slides relative to the foundation along the slide mechanism and for coaxially rotating the panel module relative to the foundation, the turntable mechanism comprising:
a pin for inserting into the first redirecting slot, the constraining slot and the second redirecting slot of the track structure as the turntable mechanism slides relative to the slide mechanism along a first direction; and
a spring disposed on an end of the pin for sliding the pin from the first redirecting slot to the constraining slot and for sliding the pin from the constraining slot to the second redirecting slot along a direction perpendicular to the first direction.

12. The adjusting device of claim 11, wherein the spring stores a resilient recovering force when the pin slides to the first redirecting slot.

13. The adjusting device of claim 11, further comprising:
a resilient mechanism disposed on an end of the slide mechanism and connected to the turntable mechanism via a flexible component for sliding the turntable mechanism relative to the slide mechanism along the second direction.

14. The adjusting device of claim 13, wherein the pin is further for wedging inside the constraining slot, so as to constrain the turntable mechanism from sliding relative to the slide mechanism along the second direction by the resilient mechanism.

15. A computer system comprising:
a foundation;
a panel module disposed on the foundation;
a supporter pivoting to the foundation for pivoting relative to the foundation so as to adjust a view angle of the panel module; and
an adjusting device disposed between the panel module, the foundation and the supporter, the adjusting device comprising:
a rotating mechanism disposed between the foundation and the supporter for adjusting an angle between the supporter and the foundation, the rotating mechanism comprising a protruding portion, and the protruding portion being rotated relative to the foundation with the supporter synchronously;

a slide mechanism disposed on the foundation, the slide mechanism comprising:
  a pivot axle; and
  a constraining component pivoted to the pivot axle for blocking the protruding portion of the rotating mechanism so as to constrain rotation of the supporter relative to the foundation; and
a turntable mechanism slidably disposed on the slide mechanism for holding the panel module so that the panel module slides relative to the foundation along the slide mechanism, and for coaxially rotating the panel module relative to the foundation, the turntable mechanism comprising:
  a contacting component for pushing the constraining component to pivot relative to the pivot axle when the turntable mechanism slides relative to the slide mechanism, so as to separate the constraining component from the protruding portion for releasing constraint on the supporter relative to the foundation.

16. The computer system of claim 15, wherein the slide mechanism further comprises a torsional spring for pivoting the constraining component relative to the pivot axle when the contacting component is separated from the constraining component, so as to recover the constraining component to an initial position.

17. The computer system of claim 15, wherein the slide mechanism of the adjusting device comprises:
  a base;
  a slot structure slidably disposed on the base, the slot structure comprising a first channel, a first contacting part, a sunken part, a second contacting part and a second channel;
  a clip structure connected to the slot structure, the clip structure sliding relative to the base with the slot structure synchronously;
  a positioning rod pivoting to the base for sliding from the first channel to the first contacting part when the slot structure slides relative to the base along a first direction, and further for sliding from the first contacting part to the sunken part and from the second contacting part to the second channel when the slot structure slides relative to the base along a second direction opposite to the first direction; and
  a resilient component connected to the slot structure and the base for sliding the slot structure relative to the base along the second direction so as to move the positioning rod from the second contacting part to the second channel;
  wherein the turntable mechanism further comprises:
  a connecting portion for pushing the slot structure and the clip structure to slide relative to the base, and the connecting portion being clipped by the clip structure when the positioning rod is engaged inside the sunken part so as to constrain a slide of the turntable mechanism relative to the slide mechanism along the second direction.

18. The computer system of claim 17, wherein the resilient component is further for sliding the slot structure relative to the base along the second direction when the connecting portion is clipped by the clip structure, so as to slide the positioning rod from the first contacting part to the sunken part.

19. The computer system of claim 17, wherein the adjusting device further comprises:
  a resilient mechanism disposed on an end of the slide mechanism and connected to the turntable mechanism via a flexible component for sliding the turntable mechanism relative to the slide mechanism along the second direction.

20. The computer system of claim 19, wherein the positioning rod is engaged inside the sunken part of the slot structure when the connecting portion is clipped by the clip structure, so as to prevent the turntable mechanism from sliding relative to the slide mechanism along the second direction by the resilient mechanism.

21. The computer system of claim 15, wherein the slide mechanism of the adjusting device further comprises:
  a bottom; and
  a track structure disposed on the bottom, the track structure comprising a first redirecting slot, a constraining slot and a second redirecting slot;
  wherein the turntable mechanism further comprises:
  a pin for inserting into the first redirecting slot, the constraining slot and the second redirecting slot of the track structure as the turntable mechanism slides relative to the slide mechanism along a first direction; and
  a spring disposed on an end of the pin for sliding the pin from the first redirecting slot to the constraining slot and for sliding the pin from the constraining slot to the second redirecting slot along a direction perpendicular to the first direction.

22. The computer system of claim 21, wherein the spring stores a resilient recovering force when the pin slides to the first redirecting slot.

23. The computer system of claim 21, wherein the adjusting device further comprises:
  a resilient mechanism disposed on an end of the slide mechanism and connected to the turntable mechanism via a flexible component for sliding the turntable mechanism relative to the slide mechanism along the second direction.

24. The computer system of claim 23, wherein the pin is further for wedging inside the constraining slot, so as to constrain the turntable mechanism from sliding relative to the slide mechanism along the second direction by the resilient mechanism.

* * * * *